UNITED STATES PATENT OFFICE.

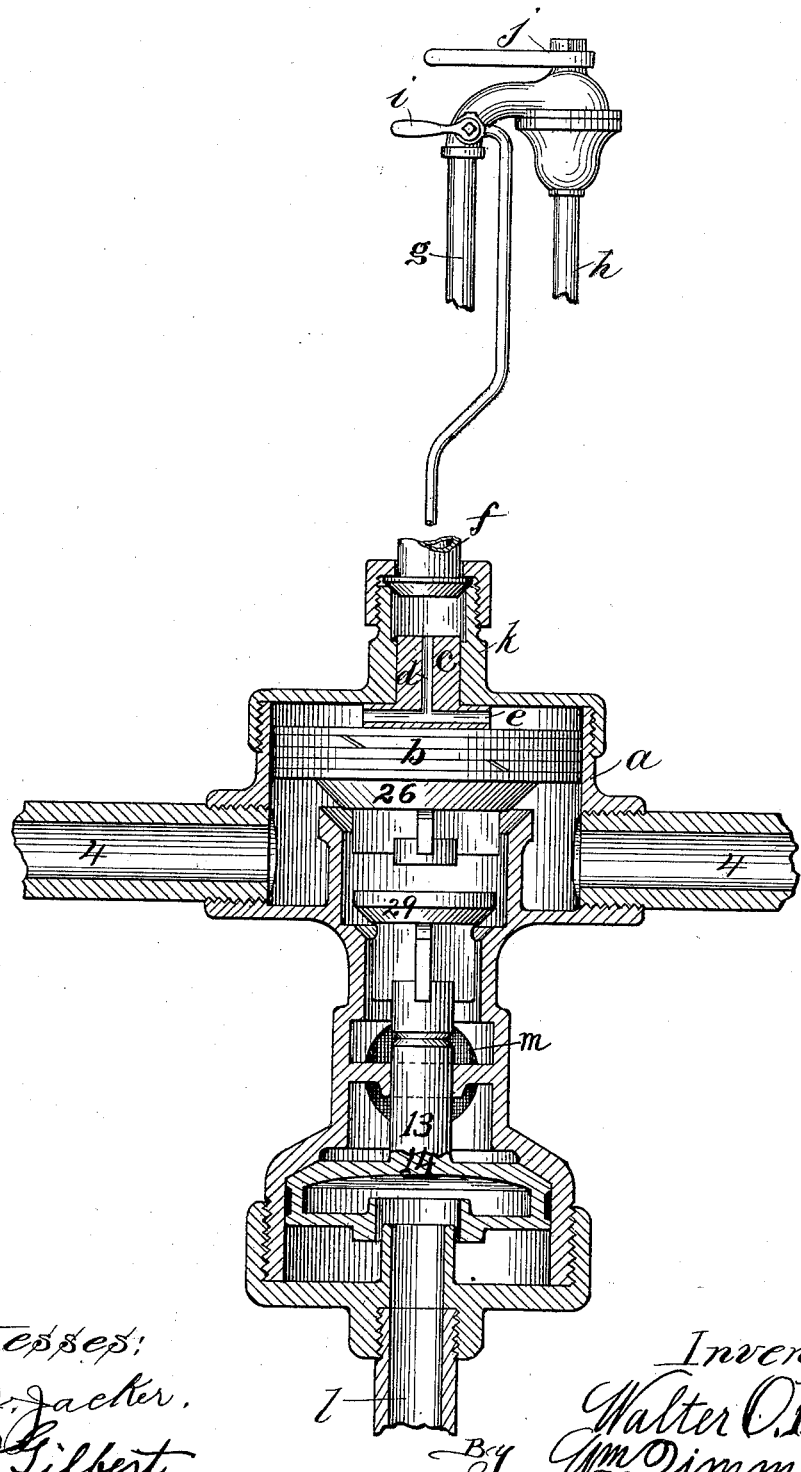

WALTER O. PELHAM, OF OLEAN, NEW YORK.

DRIVE-WHEEL-BRAKE-RELEASING DEVICE.

SPECIFICATION forming part of Letters Patent No. 652,218, dated June 19, 1900.

Application filed September 14, 1899. Serial No. 730,469. (No model.)

*To all whom it may concern:*

Be it known that I, WALTER O. PELHAM, a citizen of the United States, residing at Olean, in the county of Cattaraugus and State of New York, have invented certain new and useful Improvements in Drive-Wheel-Brake-Releasing Devices, which are fully set forth in the following specification, reference being had to the accompanying drawing, forming a part hereof, and in which are shown the shell $a$ of my said improved device and two of its internal parts in central longitudinal section, together with parts of its four connecting-pipes $f\,l$ and 4 4, also in section.

The object of my invention is to improve the mechanism and to add new functions to my Patent No. 618,478, of January 31, 1899, granted to me for a similar purpose, wherewith the set of the brakes of the engine-driving wheels may be retained or released without disturbing the action of the brakes on the balance of the train while the old part of my said valve mechanism is either under pressure from the steam-chest or released therefrom. To attain my said new end, I use said old construction with all its functions, as shown in said patent, and add to its old valve 26 a piston $b$, integral therewith, and seat said valve at the top of its cage or well. A guide-stem $c$ of said piston is held in an extension $k$ on the shell-cap and is provided with an air-passage $d\,e$ to admit air on the piston $b$ by the pipe $f$, taking air from the main reservoir-pipe $g$, governed by a two-way gate $i$, adapted to both admit and discharge air, and whereby valve 26 is seated against the lesser air-pressure in the branch pipes 4 4 and the brakes on the engine-driving wheels are applied. As the valves 26 29 never touch, the said action of the brakes may be secured whether steam is on or off the engine. When steam is cut off and no pressure on the piston $b$ from the pipe $f$, the valve 26 will be raised and the valve 29 seated. If under the latter condition steam enters the steam-chest, it will, through pipe $l$, raise the valve 14, whose stem 13 will raise the valve 29, whereby pressure in the pipes 4 4 is released and discharged through the exhaust-port $m$, and said pressure is retained by seating valve 26, notwithstanding the action of the steam, and when the steam on the piston 14 and the air-pressure on the top of the piston $b$ are cut off the air-pressure will open valve 26 and seat valve 29, thus enabling the engineer to release the driver-brakes and reverse his engine while the brakes on the balance of the train remain set. By means of the opposed fluid-pressures in the pipes 4 and $f$ the valve 26 is seated or lifted through the separating-piston $b$ and two-way gate $i$.

What I claim is—

The combination with axially-superimposed valve-seats between superimposed piston-cylinders, a valve-cage within one of said cylinders, an exhaust-valve in said cage, pistons in said cylinders, and means on one of said pistons for unseating said exhaust-valve, a cage-valve fastened to the other of said pistons and regulable fluid-pressure pipes leading to the under side of both pistons, of a fluid-pressure pipe leading to the top of one of said pistons and means therein to admit and release counteracting fluid-pressure to one of said pistons, substantially as specified.

WALTER O. PELHAM.

Witnesses:
C. A. GILBERT,
WM. ZIMMERMAN.